(12) United States Patent
Pryzby

(10) Patent No.: US 8,262,478 B2
(45) Date of Patent: Sep. 11, 2012

(54) GAMING DEVICE WITH ATTACHED AUDIO-CAPABLE CHAIR

(75) Inventor: Eric M. Pryzby, Skokie, IL (US)

(73) Assignee: WMS Gaming Inc., Waukegan, IL (US)

( * ) Notice: Subject to any disclaimer, the term of this patent is extended or adjusted under 35 U.S.C. 154(b) by 1015 days.

(21) Appl. No.: 11/569,730

(22) PCT Filed: May 26, 2005

(86) PCT No.: PCT/US2005/018392
§ 371 (c)(1),
(2), (4) Date: Jun. 11, 2007

(87) PCT Pub. No.: WO2005/117647
PCT Pub. Date: Dec. 15, 2005

(65) Prior Publication Data
US 2007/0270216 A1 Nov. 22, 2007

Related U.S. Application Data

(60) Provisional application No. 60/575,153, filed on May 28, 2004, provisional application No. 60/575,604, filed on May 28, 2004, provisional application No. 60/575,605, filed on May 28, 2004, provisional application No. 60/640,350, filed on Dec. 30, 2004.

(51) Int. Cl.
*A63F 13/02* (2006.01)
*A63F 13/08* (2006.01)
*A63F 13/12* (2006.01)

(52) U.S. Cl. .......................... 463/35; 463/47

(58) Field of Classification Search ............... 297/217.3, 297/172, 463.1, 67, 440.6; 463/47, 36, 35; 273/148 B; 5/118, 12.1, 59.1; 296/69, 65.03, 296/65.01, 65.13, 65.15; 700/94; 381/94.5, 381/123, 74, 94
See application file for complete search history.

(56) References Cited

U.S. PATENT DOCUMENTS 2,689,016 A 9/1954 Lang
4,413,198 A 11/1983 Bost
(Continued)

FOREIGN PATENT DOCUMENTS
JP 5031254 2/1993

OTHER PUBLICATIONS

"International Search Report for Application No. PCT/US2005/018392, date mailed Oct. 26, 2005", 4 pgs.
"Written Opinion of the International Searching Authority for Application No. PCT/US2005/018392, date mailed Oct. 26, 2005", 9 pgs.
"U.S. Appl. No. 11/569,687 Non-Final Office Action mailed Jan. 27, 2010", 11 pgs.
"U.S. Appl. No. 11/569,687, Advisory Action mailed Dec. 21, 2010", 3 pgs.
"U.S. Appl. No. 11/569,687, Final Office Action mailed Aug. 20, 2010", 10 pgs.
(Continued)

*Primary Examiner* — Ronald Laneau
*Assistant Examiner* — Matthew D. Hoel
(74) *Attorney, Agent, or Firm* — Schwegman Lundberg & Woessner, P.A.

(57) ABSTRACT

A gaming system includes a chair communicably coupled to a gaming device. The chair includes an audio playback device operable to receive audio playback commands. The audio playback commands may be received from a gaming device physically attached to the chair, a remote gaming device, or from a network interface communicably coupling the chair to a gaming establishment audio system, a player tracking system, or other gaming establishment system. Additionally, the chair may include an audio data storage device. Audio data from the storage device may be played through speakers on the chair, audio output devices on a gaming device, or audio output devices on a peripheral attached to the gaming device such as a top box or signage peripheral.

30 Claims, 5 Drawing Sheets

U.S. PATENT DOCUMENTS

| | | | |
|---|---|---|---|
| 4,549,631 A | 10/1985 | Bose | |
| 4,705,274 A | 11/1987 | Lubeck | |
| 4,805,952 A | 2/1989 | Coleman | |
| 4,840,343 A | 6/1989 | Gasser | |
| 4,875,546 A | 10/1989 | Krnan | |
| 5,052,685 A * | 10/1991 | Lowe et al. | 463/35 |
| 5,083,738 A | 1/1992 | Infanti | |
| 5,102,192 A | 4/1992 | Barile | |
| 5,114,112 A | 5/1992 | Infanti | |
| 5,232,191 A | 8/1993 | Infanti | |
| 5,290,034 A | 3/1994 | Hineman | |
| 5,398,992 A | 3/1995 | Daniels | |
| 5,409,296 A | 4/1995 | Barile | |
| 5,437,453 A | 8/1995 | Hineman | |
| 5,522,641 A | 6/1996 | Infanti | |
| 5,542,748 A | 8/1996 | Barile | |
| 5,596,647 A * | 1/1997 | Wakai et al. | 381/77 |
| 5,617,331 A * | 4/1997 | Wakai et al. | 725/76 |
| 5,669,818 A | 9/1997 | Thorner et al. | |
| 5,678,886 A | 10/1997 | Infanti | |
| 5,762,617 A | 6/1998 | Infanti | |
| 5,791,731 A * | 8/1998 | Infanti | 297/217.3 |
| 5,807,177 A * | 9/1998 | Takemoto et al. | 463/47 |
| 5,908,354 A | 6/1999 | Okuniewicz | |
| 5,953,429 A * | 9/1999 | Wakai et al. | 381/77 |
| 6,089,663 A | 7/2000 | Hill | |
| 6,135,562 A | 10/2000 | Infanti | |
| 6,227,614 B1 | 5/2001 | Rubin | |
| 6,354,660 B1 | 3/2002 | Friedrich | |
| 6,368,216 B1 * | 4/2002 | Hedrick et al. | 463/20 |
| 6,422,670 B1 | 7/2002 | Hedrick et al. | |
| 6,422,941 B1 | 7/2002 | Thorner et al. | |
| 6,430,297 B1 | 8/2002 | Nakamura | |
| 6,443,839 B2 | 9/2002 | Stockdale et al. | |
| 6,503,147 B1 | 1/2003 | Stockdale et al. | |
| 6,530,842 B1 | 3/2003 | Wells et al. | |
| 6,572,187 B2 | 6/2003 | Laufer | |
| 6,656,041 B1 * | 12/2003 | Kaminkow et al. | 463/16 |
| 6,694,034 B2 * | 2/2004 | Julstrom et al. | 381/315 |
| 6,899,627 B2 | 5/2005 | Lam et al. | |
| 6,928,329 B1 | 8/2005 | Giaimo et al. | |
| 6,935,959 B2 | 8/2005 | Danieli et al. | |
| 7,090,582 B2 | 8/2006 | Danieli et al. | |
| 7,112,139 B2 | 9/2006 | Paz Barahona et al. | |
| 7,114,171 B2 * | 9/2006 | Brady et al. | 725/77 |
| 7,136,498 B1 | 11/2006 | Schott | |
| 7,206,426 B1 * | 4/2007 | Julstrom et al. | 381/331 |
| 7,240,093 B1 | 7/2007 | Danieli et al. | |
| 7,290,072 B2 | 10/2007 | Quraishi et al. | |
| 7,364,508 B2 | 4/2008 | Loose et al. | |
| 7,367,886 B2 | 5/2008 | Loose et al. | |
| 7,389,153 B2 | 6/2008 | Giaimo et al. | |
| 7,479,063 B2 | 1/2009 | Pryzby et al. | |
| 7,522,740 B2 * | 4/2009 | Julstrom et al. | 381/331 |
| 7,688,992 B2 | 3/2010 | Aylward et al. | |
| 7,704,147 B2 | 4/2010 | Quraishi et al. | |
| 7,766,747 B2 | 8/2010 | Bonney et al. | |
| 7,819,750 B2 | 10/2010 | Lam et al. | |
| 7,826,627 B2 | 11/2010 | Radek | |
| 7,867,085 B2 | 1/2011 | Pryzby et al. | |
| 8,000,484 B2 | 8/2011 | Rasmussen | |
| 8,029,369 B2 | 10/2011 | Hahn | |
| 2002/0041069 A1 | 4/2002 | Steelman | |
| 2002/0155887 A1 * | 10/2002 | Criss-Puszkiewicz et al. | 463/29 |
| 2003/0044033 A1 * | 3/2003 | Julstrom et al. | 381/315 |
| 2003/0054880 A1 | 3/2003 | Lam et al. | |
| 2003/0100359 A1 * | 5/2003 | Loose et al. | 463/20 |
| 2003/0122973 A1 | 7/2003 | Huang | |
| 2003/0152243 A1 * | 8/2003 | Julstrom et al. | 381/315 |
| 2003/0217363 A1 * | 11/2003 | Brady et al. | 725/76 |
| 2004/0007907 A1 * | 1/2004 | DiRe | 297/217.3 |
| 2004/0014514 A1 | 1/2004 | Yacenda | |
| 2004/0018867 A1 * | 1/2004 | Manz | 463/20 |
| 2004/0142747 A1 | 7/2004 | Pryzby | |
| 2004/0161115 A1 | 8/2004 | Loose | |
| 2004/0162144 A1 | 8/2004 | Loose et al. | |
| 2004/0254006 A1 | 12/2004 | Lam et al. | |
| 2004/0254020 A1 | 12/2004 | Dragusin | |
| 2005/0054442 A1 | 3/2005 | Anderson et al. | |
| 2005/0239434 A1 * | 10/2005 | Marlowe | 455/345 |
| 2006/0068908 A1 | 3/2006 | Pryzby et al. | |
| 2006/0068909 A1 | 3/2006 | Pryzby et al. | |
| 2006/0073881 A1 | 4/2006 | Pryzby et al. | |
| 2006/0100015 A1 | 5/2006 | Loose et al. | |
| 2006/0116073 A1 * | 6/2006 | Richenstein et al. | 455/3.06 |
| 2006/0269088 A1 * | 11/2006 | Julstrom et al. | 381/315 |
| 2007/0015570 A1 | 1/2007 | Pryzby | |
| 2007/0293304 A1 | 12/2007 | Loose et al. | |
| 2008/0009347 A1 | 1/2008 | Radek | |
| 2008/0039215 A1 | 2/2008 | Hahn | |
| 2008/0054561 A1 | 3/2008 | Canterbury et al. | |
| 2008/0064486 A1 | 3/2008 | Pryzby et al. | |
| 2008/0070685 A1 | 3/2008 | Pryzby et al. | |
| 2008/0096666 A1 | 4/2008 | Pryzby et al. | |
| 2008/0111408 A1 | 5/2008 | Duran et al. | |
| 2008/0139284 A1 | 6/2008 | Pryzby et al. | |
| 2008/0161108 A1 | 7/2008 | Dahl et al. | |
| 2008/0176654 A1 | 7/2008 | Loose et al. | |
| 2008/0188291 A1 | 8/2008 | Bonney et al. | |
| 2008/0194319 A1 | 8/2008 | Pryzby et al. | |
| 2008/0211276 A1 | 9/2008 | Rasmussen | |
| 2008/0214289 A1 | 9/2008 | Pryzby et al. | |
| 2008/0234026 A1 | 9/2008 | Radek | |
| 2008/0246321 A1 | 10/2008 | Canterbury | |
| 2009/0170597 A1 | 7/2009 | Bone | |
| 2009/0298579 A1 | 12/2009 | Radek et al. | |
| 2010/0029385 A1 | 2/2010 | Garvey et al. | |
| 2010/0075750 A1 | 3/2010 | Bleich | |
| 2010/0248815 A1 | 9/2010 | Radek | |
| 2010/0298051 A1 | 11/2010 | Loose et al. | |
| 2010/0317437 A1 | 12/2010 | Berry et al. | |

OTHER PUBLICATIONS

"U.S. Appl. No. 11/569,687, Preliminary Amendment filed Nov. 28, 2006", 3 pgs.

"U.S. Appl. No. 11/569,687, Response filed May 27, 2010 to Non Final Office Action mailed Jan. 27, 2010", 14 pgs.

"U.S. Appl. No. 11/569,687, Response filed Nov. 22, 2010 to Final Office Action mailed Aug. 20, 2010", 16 pgs.

"U.S. Appl. No. 11/569,689, Amendment and Response filed Aug. 16, 2010 to Final Office Action mailed Sep. 14, 2009", 22 pgs.

"U.S. Appl. No. 11/569,689, Final Office Action mailed Sep. 14, 2009", 18 pgs.

"U.S. Appl. No. 11/569,689, Non-Final Office Action mailed Jan. 13, 2009", 16 pgs.

"U.S. Appl. No. 11/569,689, Preliminary Amendment filed Nov. 28, 2006", 3 pgs.

"U.S. Appl. No. 11/569,689, Response filed Jul. 10, 2009 to Non Final Office Action mailed Jan. 13, 2009", 11 pgs.

"U.S. Appl. No. 11/569,732 Non-Final Office Action mailed Sep. 10, 2010", 12 pgs.

"U.S. Appl. No. 11/569,732, Examiner Interview Summary Request Sep. 24, 2009", 2 pgs.

"U.S. Appl. No. 11/569,732, Final Office Action mailed Apr. 16, 2010", 12 pgs.

"U.S. Appl. No. 11/569,732, Non-Final Office Action mailed Mar. 18, 2009", 16 pgs.

"U.S. Appl. No. 11/569,732, Preliminary Amendment filed Nov. 28, 2006", 3 pgs.

"U.S. Appl. No. 11/569,732, Response filed Aug. 16, 2010 to Final Office Action mailed Apr. 16, 2010", 19 pgs.

"U.S. Appl. No. 11/569,732, Response filed Sep. 17, 2009 to Non Final Office Action mailed Mar. 18, 2009", 13 pgs.

"U.S. Appl. No. 11/569,732, Response filed Jan. 29, 2010 to Restriction Requirement mailed Dec. 29, 2009", 7 pgs.

"U.S. Appl. No. 11/569,732, Response filed Dec. 10, 2010 to Non-Final mailed Sep. 10, 2010", 19 pgs.

"U.S. Appl. No. 11/569,732, Restriction Requirement mailed Dec. 29, 2009", 6 pgs.

"U.S. Appl. No. 11/569,687 Final Office Action mailed Aug. 20, 2010", 10 pgs.

"International Application Serial No. PCT/US05/18392, International Search Report mailed Oct. 26, 2005", 3 pgs.

"International Application Serial No. PCT/US05/18392, Written Opinion mailed Oct. 26, 2005", 8 pgs.

"U.S. Appl. No. 11/569,687, Examiner Interview Summary", 4 pgs.

"U.S. Appl. No. 11/569,687, Response filed Jun. 14, 2011 to Non Final Office Action mailed Mar. 31, 2011", 16 pgs.

"U.S. Appl. No. 11/569,689, Notice of Allowance mailed Jun. 27, 2011", 12 pgs.

"U.S. Appl. No. 11/569,687, Final Office Action mailed Sep. 2, 2011", 27 pgs.

"U.S. Appl. No. 11/569,687, Response filed Dec. 22, 2011 to Final Office Action mailed Sep. 2, 2011", 16 pgs.

"U.S. Appl. No. 11/569,689, Applicant's Summary of Examiner Interview filed Aug. 22, 2011", 2 pgs.

"U.S. Appl. No. 11/569,689, Examiner Interview Summary mailed Jul. 22, 2011", 3 pgs.

* cited by examiner

GAMING DEVICE WITH ATTACHED AUDIO-CAPABLE CHAIR

CROSS-REFERENCE TO RELATED APPLICATIONS

This application is a U.S. National Stage Filing under 35 U.S.C. 371 from International Patent Application Serial No. PCT/US2005/018392, filed May 26, 2005, and published on Dec. 15, 2005 as WO 2005/117647 A1, which claims the benefit of U.S. Provisional Application Ser. No. 60/575,153, filed May 28, 2004. This application is related to U.S. Provisional Patent Application Ser. No. 60/575,604, entitled "SPEAKER SYSTEM FOR A GAMING MACHINE" and is also related to U.S. Provisional Patent Application Ser. No. 60/575,605, entitled "CHAIR INTERCONNECTION FOR A GAMING MACHINE", both filed on May 28, 2004, and is also related to U.S. Provisional Patent Application Ser. No. 60/640,350, entitled "CHAIR INTERCONNECTION FOR A GAMING MACHINE", filed Dec. 30, 2004, all of which are hereby incorporated by reference herein for all purposes.

FIELD

The invention relates generally to gaming devices, and more specifically to gaming devices with attached audio capable chairs.

BACKGROUND

A wide variety of gaming devices are now available to game players and to gaming establishment operators in computerized form, from slot machines to games that are traditionally played live such as poker and blackjack. Computerized video game systems must provide sufficient feedback to the game player to make the game fun to play, and they must provide a gaming experience that is at least as attractive as the older mechanical gaming machine experience to the gamer, to ensure success in a competitive gaming market.

Many computer elements have been employed in gaming systems, from computerized animation to playing prerecorded sounds through a gaming system's speakers. For example, these sounds are loaded within the computerized gaming machine and played through speakers to supplement and enhance the wagering game experience. However, past gaming systems have typically been limited those having speakers and audio content provided on the gaming device itself. As a result, there is a need to increase the player's gaining experience by providing increased audio capabilities for gaming machines.

SUMMARY

The above-mentioned shortcomings, disadvantages and problems are addressed by the present invention, which will be understood by reading and studying the following specification.

In one aspect a gaming system includes a chair communicably coupled to a gaming device. The chair includes an audio playback device operable to receive audio playback commands. The audio playback commands may be received from a gaming device physically attached to the chair, a remote gaming device, or from a network interface communicably coupling the chair to a gaming establishment audio system, a player tracking system, or other gaming establishment system.

In a further aspect of the gaming system, the chair includes an audio data storage device. Audio data from the storage device may be played through speakers on the chair, audio output devices on a gaming device, or audio output devices on a peripheral attached to the gaming device such as a top box or signage peripheral.

The inventive subject matter includes systems and methods of varying scope. In addition to the aspects and advantages of the present invention described in this summary, further aspects and advantages of the embodiments of the invention will become apparent by reference to the drawings and by reading the detailed description that follows.

DETAILED DESCRIPTION

Figure 1:
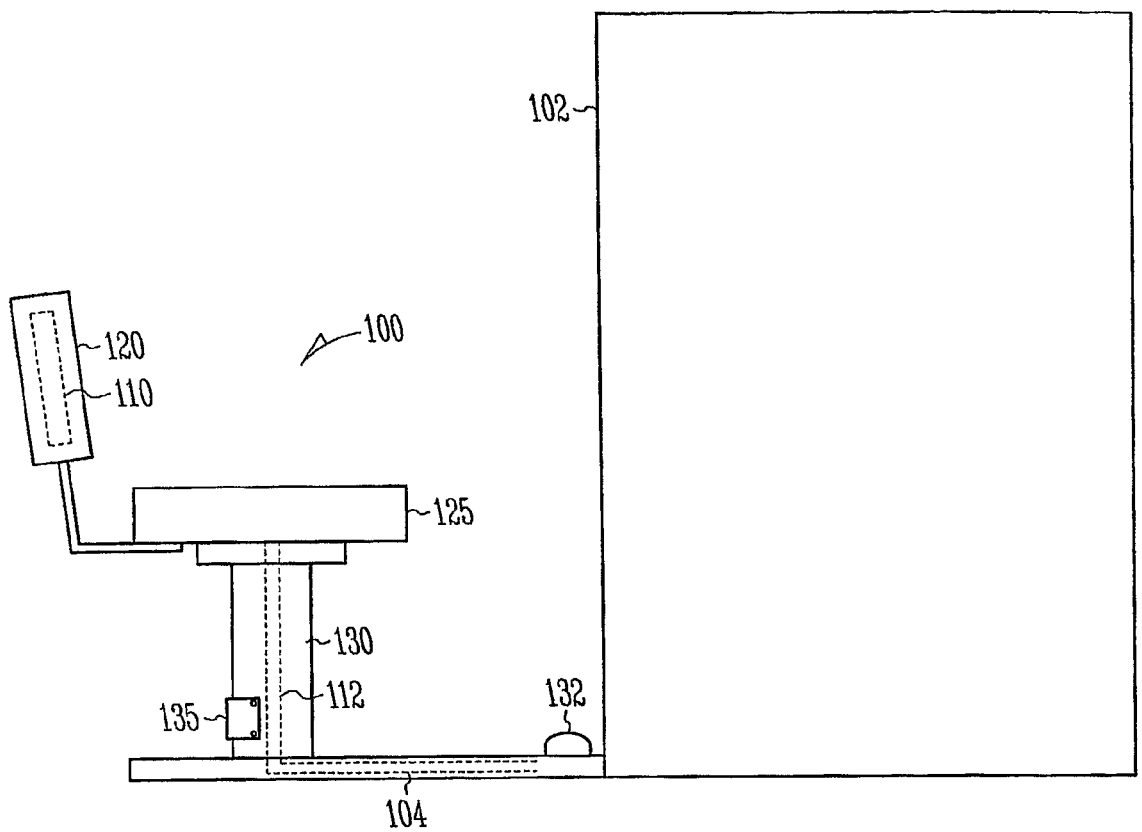
FIG. 1 shows the general environment for a gaming system according to one embodiment.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The description of the various embodiments is to be construed as exemplary only and does not describe every possible instance of the invention. Numerous alternatives could be implemented, using combinations of current or future technologies, which would still fall within the scope of the claims. The present invention is directed to a audio-capable chair for use with a gaming device.

The following detailed description is, therefore, not to be taken in a limiting sense, and the scope of the present invention is defined only by the appended claims.

FIG. 1 shows the general environment for a gaming system incorporating embodiments of the invention. In this example, the system includes chair 100 capable of being electrically and mechanically coupled to a gaming device 102. In some embodiments, gaming device 102 is operable to conduct a wagering game. These wagering games may include reel based games such as video or mechanical slot machine games, card based games such as video poker, video dice games (e.g. a Yahtzee® like dice game) or other types of wagering games typical in the gaming industry. If based in video, the gaming device 102 includes a video display such as a cathode ray tube (CRT), liquid crystal display (LCD), plasma, or other type of video display known in the art. In some embodiments, a touch screen overlies the display. In the some embodiments, the gaming device 102 is an "upright" version in which the display is oriented vertically relative to a player. Alternatively, the gaming device may be a "slant-top" version in which the display is slanted at about a thirty-degree angle toward the player. In further embodiments, the gaming device may be a table-top gaming device in which the display is substantially horizontal. In some embodiments, chair 100 is coupled to the gaming machine via a sled or base 104.

The system further includes a speaker package 110 incorporated into chair 100 and coupled via an electrical connection to gaming device 102. Gaming device 102 includes hardware and software control systems and produces sound signals which are delivered to speaker package 110. Speaker package 110 provides sound effects, game noises, and other audio effects from gaming device 102. In one example, an electrical connection 112 runs through base 104 from machine 102 to speaker package 110 in the chair.

Chair 100 generally includes a back 120 and a seat 125. The chair may be swivel mounted to a seat post 130. Seat post 130 is at least partially hollow to allow connection 112 to run through the post. An access panel 135 can be provided in the seat post 130 to allow access to connection 112 to allow a user to connect wires running from speaker package 110 to a circuit board connection in base 104. Base 104 is removably connectable to gaming device 102, both mechanically and electrically. This allows for easier installation and maintenance than a permanent connection.

Figure 2:
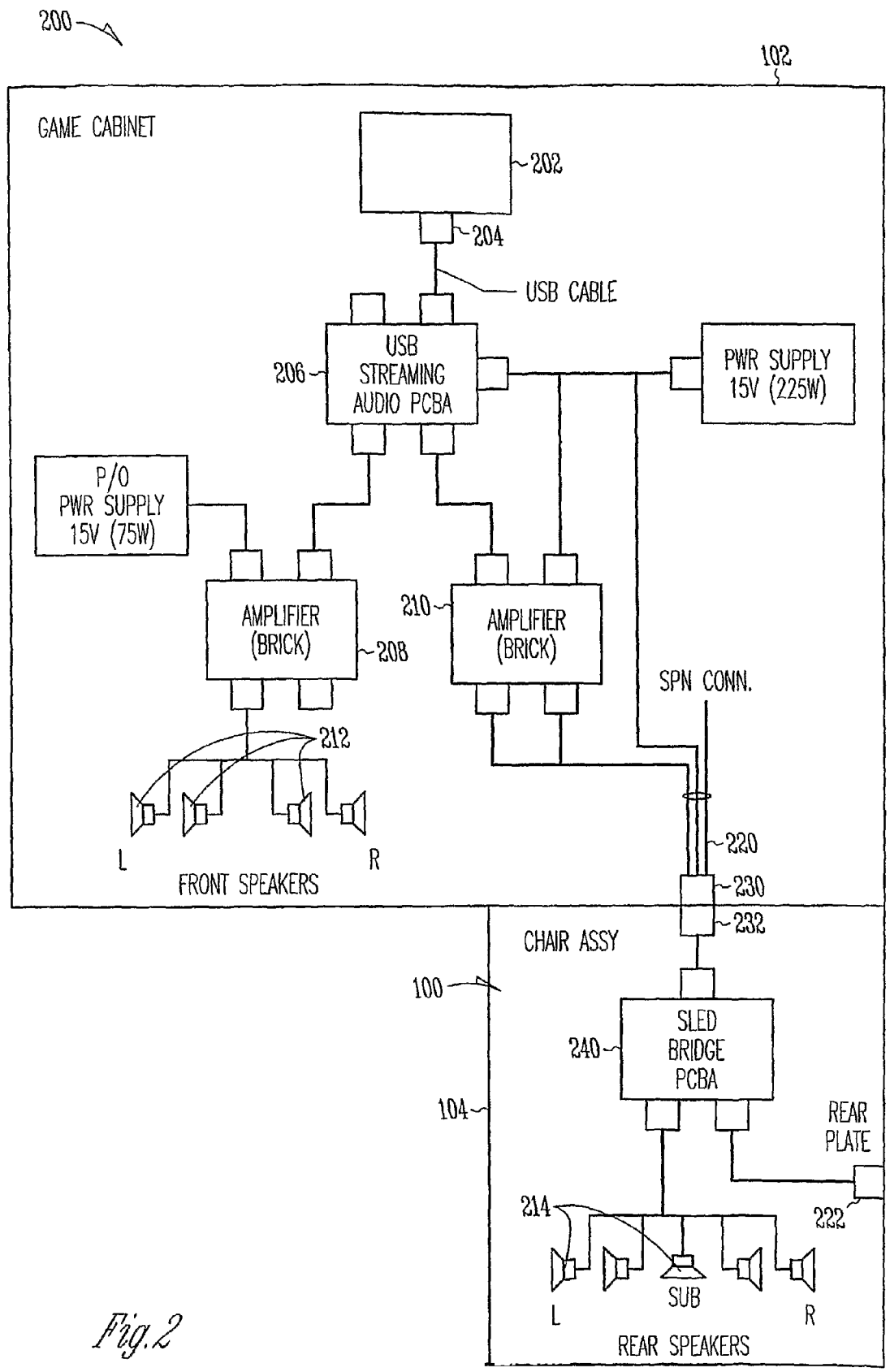
FIG. 2 shows a schematic representation of components of an audio subsystem, in accordance with one embodiment.

FIG. 2 shows a schematic representation of components of an audio subsystem 200, in accordance with one embodiment. For example, audio data resides on CompactFlash media used for holding the game code and inserted into a receptacle for the media located on a circuit board 202. The game software running on circuit board 202 is responsible for determining when to play certain sounds and for the mixing of the sounds. The mixed digital audio is then output via a USB port 204 located on the circuit board. The audio data transmitted over the USB bus consists of four discrete audio channels (2 stereo channels). A USB streaming audio circuit board 206 receives the audio data and splits it into two separate stereo outputs (the outputs can be line level or digital (S/PDIF). These outputs are routed to two audio amplifier modules 208 and 210,—one amplifier is for front speakers 212 (speakers located in machine 102) and amplifier 210 is for rear speakers 214 (speakers located in chair 100).

The amplified audio to chair 100 is taken from two separate connectors—one connector provides for the audio for the left and right speakers and one provides the audio for a subwoofer, for example. These outputs are bundled in a cable 220 along with SPN serial communications and power. The serial communications and power are provided to the chair for components such as a display 222. Display can be a lit sign, a video display, or other component that could be located on the back of the chair. These connections go to a connector 230 fixed to the cabinet of game device 102 which mates with a connector 232 on base 104 of the chair. The corresponding connector 232 on base 104 includes a short wire harness connected to the connector that plugs into a connector on a circuit board 240 that runs almost the entire length of the chair base 104, ending below the chair post.

Figure 3:
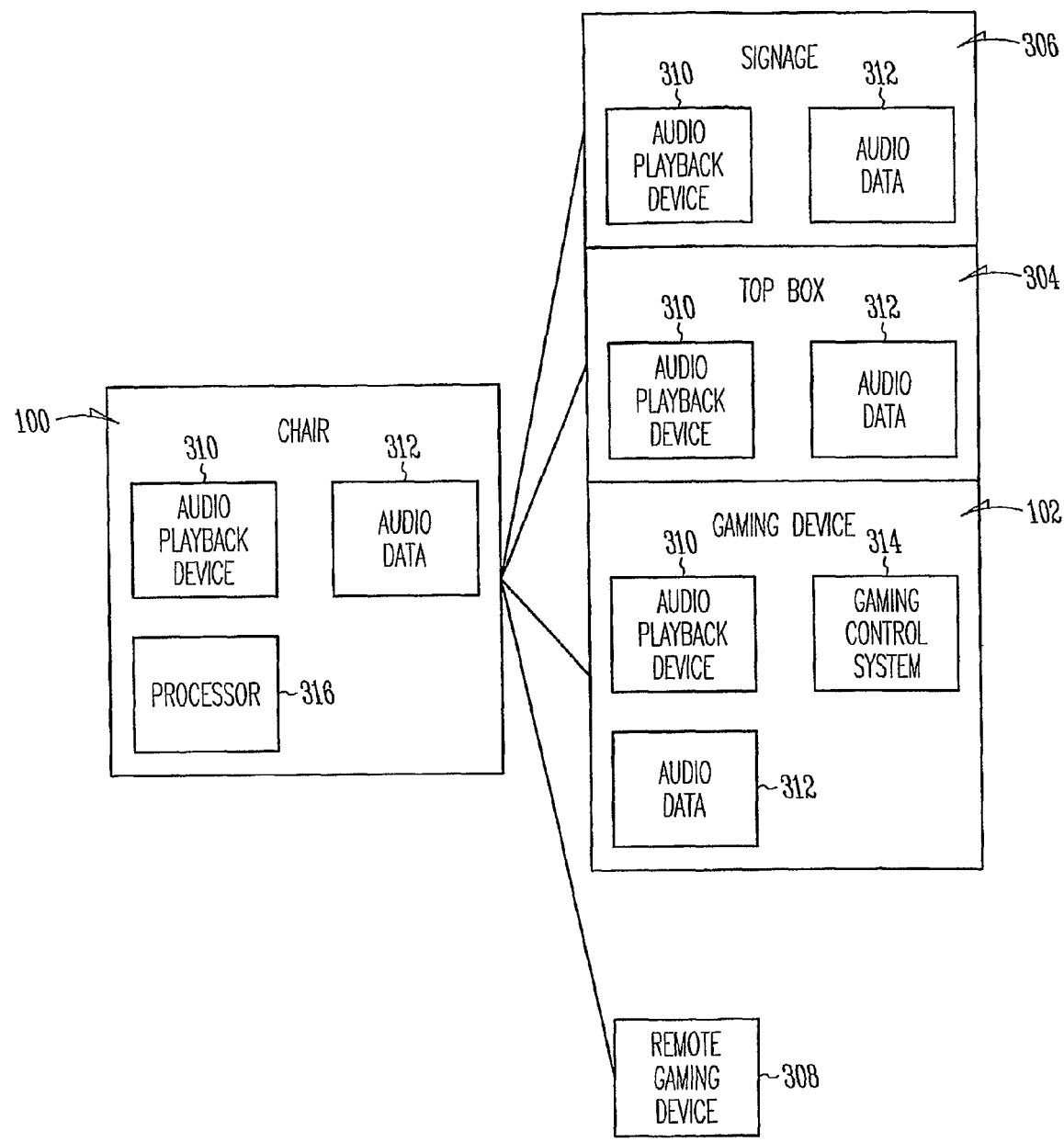
FIG. 3 is a block diagram of components included in a gaming system according to embodiments of the invention.

FIG. 3 is a block diagram of components included in a gaming system according to embodiments of the invention. In some embodiments, the system includes chair 100 and a gaming device 102. In alternative embodiments, the system may include remote gaming device 308.

Chair 100 may include audio playback device 310. In one embodiment, audio playback device 310 comprises a sound card device capable of receiving audio signals (either analog or digital) and playback commands, and further capable of providing output to speakers 214. In alternative embodiments, audio playback device 310 may be a CD player, a DVD player or an MPEG player.

In alternative embodiments, chair 100 includes audio data storage device 312. Audio data storage 312 may be included instead of or in addition to audio playback device 310. Audio data storage 312 is capable of storing data in compressed or uncompressed format, and may store digital or analog audio data. In varying embodiments audio data storage 312 may comprise RAM, ROM, EPROM, flash memory, compact flash memory, hard drive, CD ROM, DVD ROM, tape storage, or any other storage media capable of storing digital or analog audio data.

In further alternative embodiments, chair 100 may include a processor 316. Processor 316 may be part of a control system capable of controlling the operation of audio playback device 310 and/or audio data storage 312.

Gaming device 102 includes a gaming control system 314 that controls the operation of gaming device 102. For example, gaming control system 314 typically has hardware and software to manage game play, receive input from buttons, coin acceptors, bill acceptors, ticket readers, and provide output to displays or reels included in gaming device 102. In some embodiments, game control system 314 may be incorporated on circuit board 202 (FIG. 2).

In some embodiments, gaming device 102 includes a top box 304. Top box 304 may contain a video display, a mechanical display, or a diorama display that supplements a primary display for gaming device 102. For example, the display in top box 304 may be a wheel such as a rotating wheel, mechanical dice, a board for a board game, or other such display.

In some embodiments, gaming device 102 may include signage 306. Signage 306 may be a display device capable of displaying advertising, gaming information (e.g. type of game, denomination of game etc.) or other information to a player or potential player.

Gaming device 102, top box 304 and/or signage 306 may include an audio playback device 310. Like chair 100, the audio playback device on gaming machine 102, top box 304 and/or signage 306 may be a sound card device capable of receiving audio signals (either analog or digital) and playback commands, and further capable of providing audio output. In alternative embodiments, audio playback device 310 may be a CD player, a DVD player or an MPEG player.

Also, gaming device 102, top box 304 and/or signage 306 may include audio data storage. Again like chair 100, audio data storage 312 on gaming machine 102, top box 304 and/or signage 306 may be any storage mechanism capable of storing data in compressed or uncompressed format, and may store digital or analog audio data. In varying embodiments audio data storage 312 may comprise RAM, ROM, EPROM, flash memory, compact flash memory, hard drive, CD ROM, DVD ROM, tape storage, or any other storage media capable of storing digital or analog audio data.

In some embodiments chair 100 is physically coupled to a gaming device 102. Chair 100 may be removably or fixedly coupled to gaming device 102. In alternative embodiments, chair 100 may be communicably coupled to a remote gaming device 308. In such embodiments, the coupling to remote gaming device 308 is electrical, however the chair 100 is not physically attached to remote gaming device 308. Remote gaming device 308 may have the same components as gaming device 102.

Figure 4:
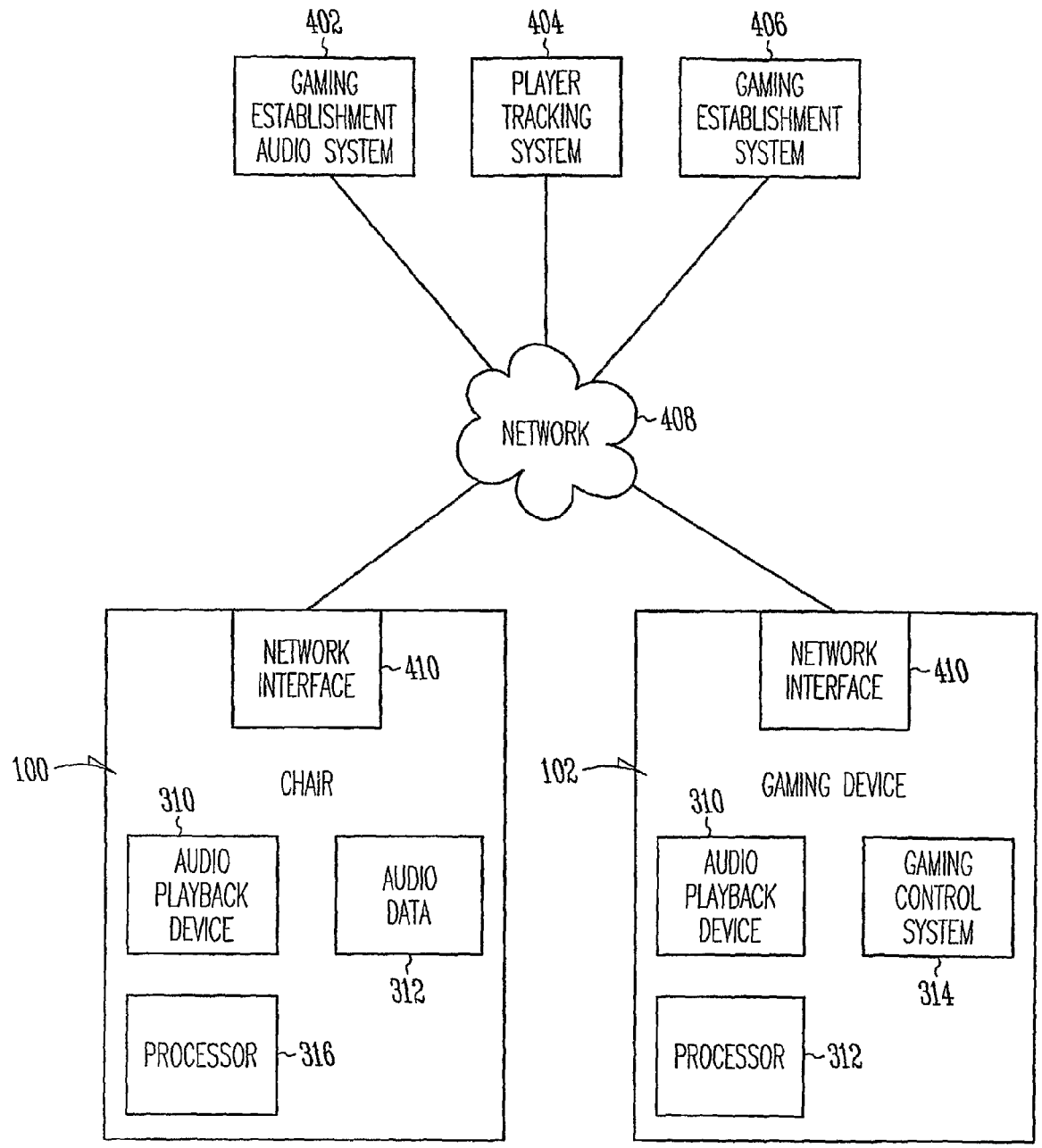
FIG. 4 is a block diagram of components included in a networked gaming system according to embodiments of the invention.

FIG. 4 is a diagram of components included in a networked gaming system according to embodiments of the invention. In some embodiments, the networked gaming system may include gaming establishment audio system 402, player tracking system 404, or other gaming establishment system and gaming device 102 coupled to network 408. Additionally, in some embodiments, chair 100 may be communicably coupled to network 408.

Gaming establishment audio system 402 comprises an audio system that can distribute audio data and/or signals to various points in a gaming establishment such as a casino.

Player tracking system 404 is operable to provide player tracking services and maintain player tracking data. For example, player tracking system 404 may be used to store and analyze information about player activity on a machine and which machines a player uses.

Other gaming establishment systems 406 may be used in the operation of gaming establishment, such systems may be used to provide audio output.

Network 408 may be a local area network, a wide area network, a corporate intranet, or a special purpose network (e.g. an audio network for gaming establishment audio system 402). The invention is not limited to any particular type of network. Network 408 may be a TCP/IP based network, or network 408 may use other protocols known in the art.

In some embodiments, gaming device 102 may be attached to network 408. In these embodiments, gaming device 102 will include a network interface 410 coupled to gaming control system 314. Similarly, in some embodiments chair 100 may also be communicably coupled to network 408. In these embodiments chair 100 may include a network interface 410 communicably coupled to a processor 316 on chair 100.

A remote gaming device 308 may also be communicably coupled to network 408.

It should be noted that the gaming systems illustrated in FIGS. 3 and 4 are intended to illustrate some of the various components that may be included in varying embodiments of the invention. No embodiment of the invention need have all of the components described and illustrated in FIGS. 3 and 4.

The operation of various embodiments of the invention that use the components described above with reference to FIGS. 1-4 will now be described.

In some embodiments, audio playback device 310 on chair 100 may receive audio output (i.e. sound output) and playback commands from a gaming device physically attached to chair 100. In alternative embodiments, audio playback device 310 on chair 100 may receive audio output and playback commands from a remote gaming device 308. In further alternative embodiments, audio playback device 310 on chair 100 may receive audio output and playback commands through network 408. Such audio output may be provided by gaming establishment audio system 402, player tracking system 404 or other gaming establishment system 406. In still further alternative embodiments, audio playback device 310 on chair 100 may receive audio output from a peripheral device on gaming device 102 such as top box 304 or signage 306. The audio output may be played on speakers attached to chair 100.

In embodiments where chair 100 includes audio data storage 312, audio data may be sent for playback on speakers located anywhere on chair 100. In alternative embodiments, the audio data may be sent for playback from chair 100 to a gaming device 102 physically attached to chair 100. In further alternative embodiments, audio data may be sent from chair 100 to a remote gaming device 308. In still further alternative embodiments, audio data may be sent for playback from chair 100 to a peripheral device that is part of the cabinet of gaming device 102 such as a top box 304 or signage 306. In yet further embodiments, audio data may be sent from chair 100 via a network interface 410 communicably coupled to a network 408 to a gaming establishment audio system 402, player tracking system 404 or other gaming establishment system 406.

In some embodiments, gaming device 102 loads audio data from an audio storage device 312 on chair 100 into memory such as RAM maintained by a processor on gaming control system 314. The audio data may then be played back through any one or more of:

speakers located on anywhere in chair 100

Through gaming device 102 that is physically attached to chair 100

Through any remote device such as another gaming device 308

Through a peripheral device that is a part of the cabinet of gaming device 102 a remote peripheral device.

Any network connection such as local area, wide area, player tracking system, or gaming establishment sound system In some embodiments, chair 100 receives audio playback and plays audio content that is stored on an audio storage or playback device such as a CD, DVD, mpeg player, or any similar device on an attached peripheral device such as a top box 304 or signage 306. For example, a CD or DVD player may be located in a peripheral device that routes audio either directly to chair 100 or via the game cabinet wiring connections to chair 100 for playback through the chair. This audio playback may be in accompaniment of other audio that is played back via the gaming device 102 or it may be played independently of audio that is controlled by the gaming device 102.

Figure 5:
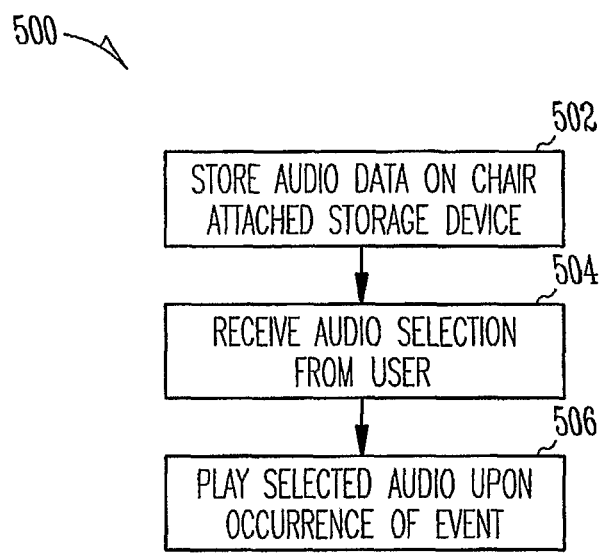
FIG. 5 is a flowchart illustrating a method for operating a gaming system in accordance with embodiments of the invention.

FIG. 5 is a flow diagram illustrating a method 500 for operating a gaming system in accordance with embodiments of the invention. The method begins by storing audio data on an audio storage device for a chair such as chair 100 (block 502).

Next, the gaming system receives a selection from a game player of a sound or group of sounds from the audio data (block 504). The selection may be through a user interface provided on the gaming device 102 or chair 100. For example, buttons, pointer devices, keyboards, or other input devices may be used to make the selection.

Then, upon the occurrence of a predetermined event or at a predetermined time during game play, the selected sound or group of sounds may be played (block 506). In varying embodiments these events include various combinations of one or more of: awarding a credit, entering a bonus round, winning a jackpot, accepting money (change or bills), accepting tokens, or accepting a ticket. The invention is not limited to any particular event.

Systems and methods for providing an audio-capable chair for use with a gaming device have been disclosed. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

What is claimed is:

1. A gaming system comprising:
   a gaming device comprising:
      one or more gaming processors;
      a game audio playback device;
      at least one memory device storing game code that, when executed by the one or more gaming processors, cause the gaming device to:
         initiate programmed game sounds;
         mix the game sounds into first audio data; and
         output the first audio data; and
   a chair communicably coupled to the gaming device and to at least one peripheral device that produces audio data independently of the gaming device, the chair including a chair audio playback device comprising one or more chair processors, a primary audio interface, and a separate network interface, the chair audio playback device configured to
      receive, via the primary audio interface, the first audio data routed directly to the chair audio playback device from the game audio playback device;
      receive, via the separate network interface, second audio data routed directly to the chair audio playback device from the at least one peripheral device;
      mix the first and second audio data into output audio data, wherein the output audio data is different from at least the second audio data; and
      transmit the output audio data to an audio output device.

2. The gaming system of claim 1, wherein the chair audio playback device comprises a sound card.

3. The gaming system of claim 1, wherein the output audio data comprises an analog audio signal.

4. The gaming system of claim 3, wherein the second audio comprises digital data.

5. The gaming system of claim 1, wherein the chair further comprises an audio storage device that stores other audio data for playback through the audio output device.

6. The gaming system of claim 1, wherein the chair audio playback device transmits the output audio data to the game audio playback device.

7. The gaming system of claim 1, wherein the at least one peripheral device is the gaming establishment audio system.

8. The gaming system of claim 1, wherein the at least one peripheral device is a player tracking system.

9. The gaming system of claim 1, wherein the at least one peripheral device is a remote gaming device.

10. The gaming system of claim 1, wherein the at least one peripheral device comprises one or more of: a set-top box and a signage component.

11. The gaming system of claim 1, wherein the chair audio playback device processes the second audio data by one or more of converting digital data to analog signals and converting analog signals to digital data.

12. A gaming system comprising:
    a plurality of gaming devices conducting respective wagering games, each gaming device from the plurality comprising:
       one or more gaming processors;
       a game audio playback device; and
       at least one memory device storing game code that, when executed by the one or more gaming processors, cause the gaming device to:
          initiate programmed game sounds related to the respective wagering game;
          mix the game sounds into first audio data; and
          output the first audio data; and
    a chair communicably coupled to the gaming device and to at least one peripheral device that produces audio data independently of the gaming device, the chair comprising a chair audio playback device having one or more chair processors, a primary audio interface, and a separate network interface, the chair audio playback device being operable to:
       receive, via the primary audio interface, the first audio data from the gaming device;
       receive, via the separate network interface, second audio data routed directly to the chair audio playback device from the at least one peripheral device;
       mix the first audio data and second audio data into output audio data, wherein the output audio data is different from at least the second audio data, and
       transmit the output audio data to an audio output device.

13. The gaming system of claim 12, wherein the audio output device comprises one or more speakers mounted to the chair.

14. The gaming system of claim 12, wherein the audio output device comprises a sound component of at least another one of the plurality of gaming devices.

15. The gaming system of claim 12, wherein one or more of the plurality of gaming devices is a remote gaming device.

16. The gaming system of claim 12, wherein the peripheral device is a remote gaming device.

17. The gaming system of claim 12, wherein the chair further comprises an audio storage device operable to store other audio data for playback through the audio output device.

18. The gaming system of claim 17, wherein the output audio data is read from the audio storage device and stored in the memory device of another gaming device of the plurality of gaming devices for playback through the audio output device.

19. The gaming system of claim 12, wherein the peripheral device comprises a set-top box.

20. The gaming system of claim 12, wherein the peripheral device comprises a signage component.

21. The gaming system of claim 12, wherein the system is connected for communication to a local area network.

22. The gaming system of claim 21, wherein the output audio data is transmitted to a gaming establishment audio system via the local area network.

23. The gaming system of claim 21, further comprising a gaming establishment audio system communicably coupled to the local area network and wherein the at least one peripheral device is the gaming establishment audio system.

24. A method of mixing audio from multiple sources in a gaming system, the method comprising:
   transmitting first audio data from a gaming device via a game audio playback device, the game audio playback device being part of the gaming device;
   receiving the first audio data via a primary audio interface of a chair audio playback device incorporated in a chair communicably coupled to the gaming device;
   transmitting second audio data directly to the chair audio playback device via at least one peripheral device; the at least one peripheral device producing the second audio data independently from the gaming device;
   receiving the second audio data via a separate network interface of the chair audio playback device;
   mixing the first audio data and the second audio data into output audio data, wherein the output audio data is different from at least the second audio data; and
   transmitting the output audio data to an audio output device.

25. The method of claim 24, wherein the output audio data is transmitted upon the occurrence of an event comprising one or more of: an award of one or more credits, a bonus round, a jackpot win, an activation event and producing a ticket.

26. The method of claim 24, further comprising:
   storing, via an audio storage device incorporated in the chair, other audio data for playback through the audio output device.

27. The gaming system of claim 26, wherein the peripheral audio playback device comprises one or more of a compact disk player, a DVD player and an MPEG player.

28. The gaming system of claim 24, wherein the peripheral device comprises one or more of: a set-top box, a signage component and a remote gaming device.

29. The gaming system of claim 26, wherein the gaming system includes a gaming control system, and further wherein the audio output device plays audio data independently from the gaming control system.

30. The gaming system of claim 24, wherein the gaming system includes a gaming control system, and further wherein the gaming control system controls the audio output device.

* * * * *